Figure 1:
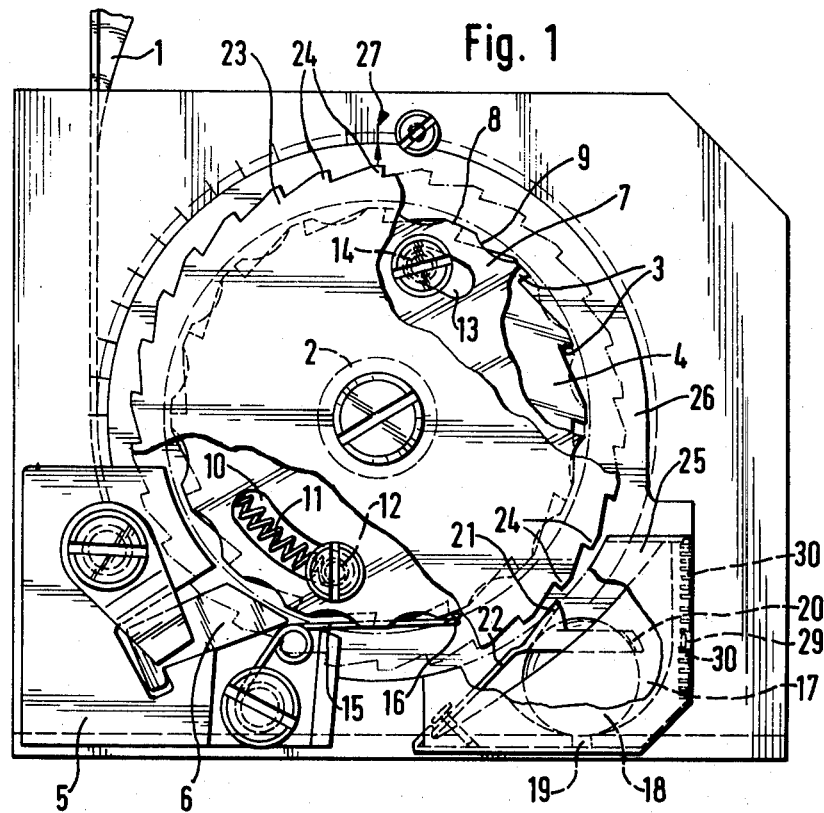

United States Patent [19]

Svensson

[11] 4,228,969
[45] Oct. 21, 1980

[54] DEVICE IN CONNECTION WITH REEL MECHANISMS FOR SAFETY BELTS FOR AUTOMOBILES

[75] Inventor: Gustav E. V. Svensson, Kolm, Sweden

[73] Assignee: Autoliv AB, Vargarda, Sweden

[21] Appl. No.: 949,677

[22] Filed: Oct. 10, 1978

[30] Foreign Application Priority Data

Oct. 12, 1977 [SE] Sweden ................................ 7711468

[51] Int. Cl.² ........................ A62B 35/02; B65H 75/48
[52] U.S. Cl. .............................................. 242/107.4 A
[58] Field of Search ................ 242/107.4 R, 107.4 E; 297/388; 280/803, 806, 807, 808

[56] References Cited

U.S. PATENT DOCUMENTS

| 4,046,332 | 9/1977 | Wheeler | 242/107.4 A |
| 4,050,644 | 9/1977 | Fohl | 242/107.4 A |
| 4,087,059 | 5/1978 | Lindblad | 242/107.4 A |

FOREIGN PATENT DOCUMENTS 1356257  6/1974  United Kingdom ............. 242/107.4 A Primary Examiner—John M. Jillions

[57] ABSTRACT

Activation device for a safety belt for a vehicle comprising a body of inertia located in a supporting cup, and an operating member cooperating with said body of inertia and with a stop mechanism for the reel shaft of the safety belt including a ratchet wheel and pawl, whereby when said body of inertia moves from a neutral position in said cup in response to an abnormal change in movement of the vehicle it causes said operating member via connecting mechanism to move said pawl into engagement with said ratchet wheel, said activation device being rotatable about a horizontal center axis of said supporting cup and displaceable about a circle having the same center as the reel shaft.

6 Claims, 8 Drawing Figures

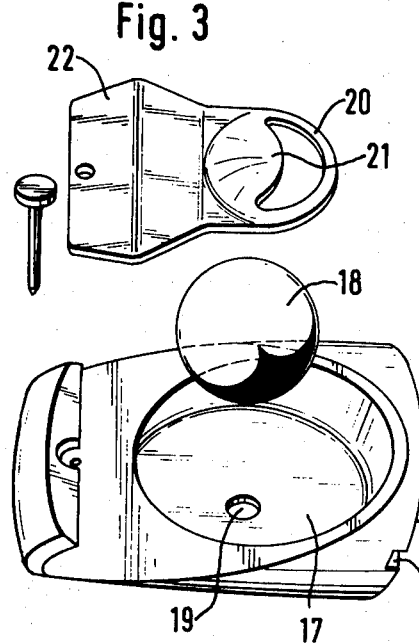
Fig. 3
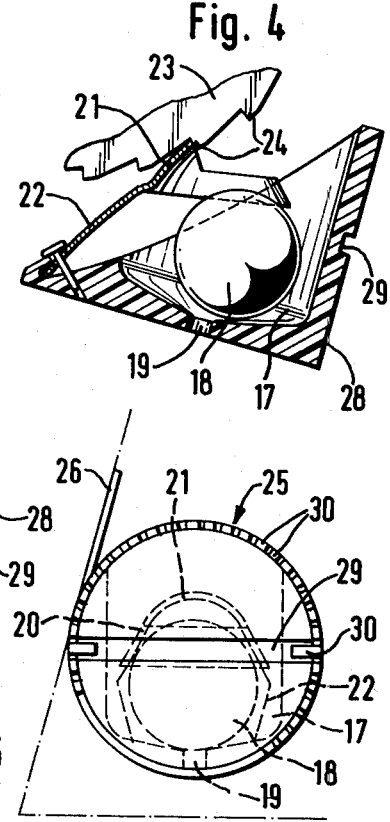
Fig. 4
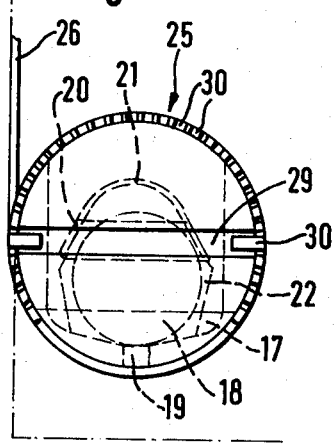
Fig. 5
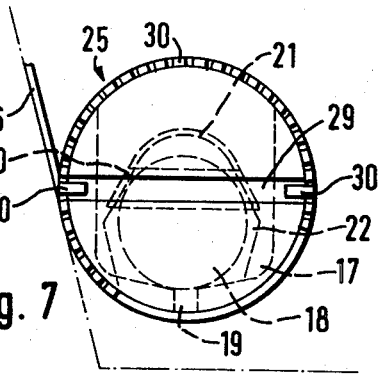
Fig. 6
Fig. 7

DEVICE IN CONNECTION WITH REEL MECHANISMS FOR SAFETY BELTS FOR AUTOMOBILES

The present invention relates to an activating means for safety belts for vehicles comprising a body of inertia located in a supporting means and an operating member cooperating with said body of inertia and cooperating with a stop mechanism for the reel shaft of a safety belt for automobiles. The stop mechanism has a wheel provided with ratchet teeth and rotates with the shaft, and there is provided a pawl cooperating with the ratchet teeth, which pawl is arranged in such a way that in connection with a displacement of the body of inertia out of a neutral position the operating member directly or indirectly moves the pawl into engagement with a ratchet tooth.

A reel mechanism in a vehicle must be designed in such a manner with respect to its construction that it is locked against unwinding of the safety belt as soon as the vehicle is subjected to abnormal changes in its movement. This, for example, takes place in connection with an abnormally quick braking of the vehicle, as is the case in connection with a collision with another vehicle. Also when the vehicle occupies an oblique position exceeding a certain maximum angle, which can occur by way of example, when the vehicle lands up in a ditch, the locking mechanism shall enter into operation. The locking mechanism in such means usually is actuated by a body of inertia, which can move at least in one lateral direction.

It is an object of the invention to provide a means of the kind mentioned above with good functional characteristics, and which relative to varying positions of mounting of the reel belt is easy to adjust.

This object is reached by a means according to the invention, which is substantially characterized by supporting means, the body of inertia and the operating member comprising one unit, which can be rotated round the horizontal center axis of the supporting means, and also can be displaced along a circular line having the same center as the reel shaft.

Figure 2:
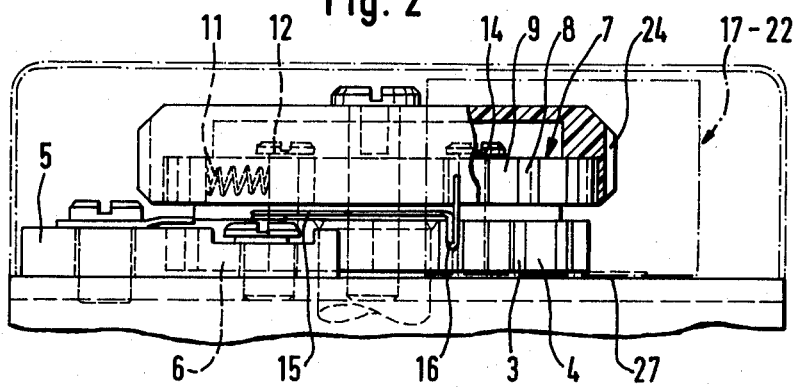
Figure 8:
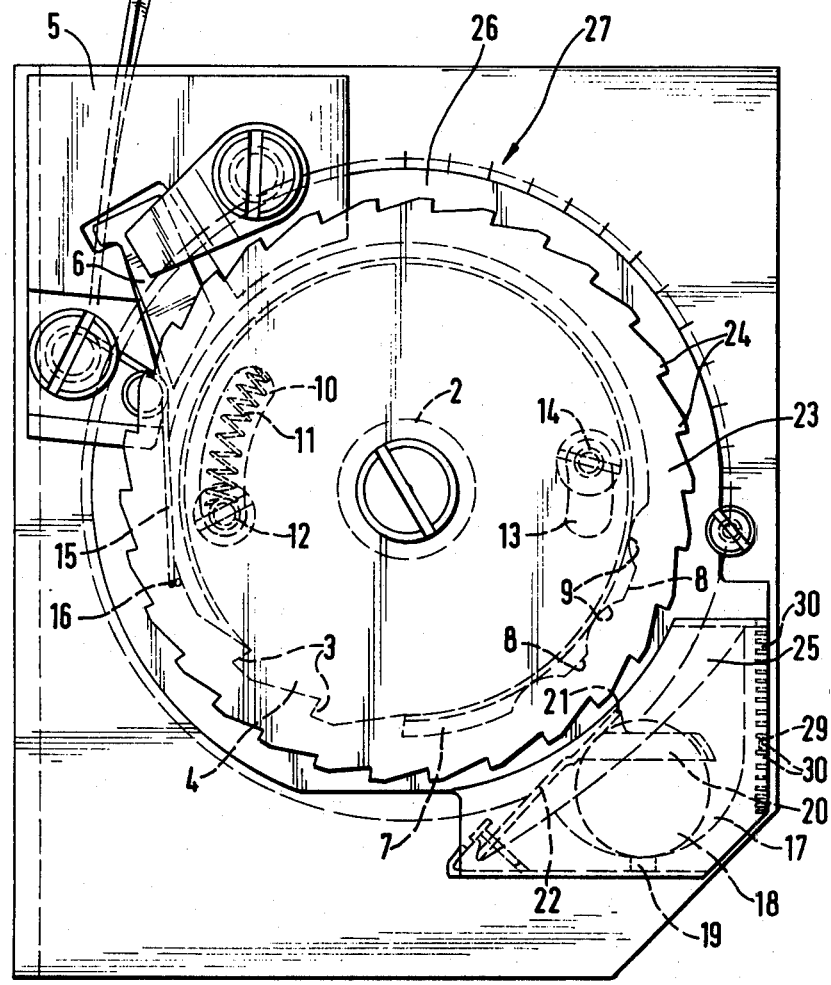

The means according to the invention will now be described in the following, reference being made to the accompanying drawings, in which FIG. 1 is a partly broken side elevational view of a reel mechanism of a safety belt for automobiles, FIG. 2 is a partly broken view of the reel mechanism illustrated in FIG. 1 as seen from a point located under the same and showing the reel mechanism with the activating means omitted, FIG. 3 is a perspective exploded view of the activating means, FIG. 4 shows a vertical longitudinal cross-section through the activating means occupying an angular position deviating from the neutral position, FIG. 5-7 illustrate this means as seen from the front end in different positions of adjustment, and FIG. 8 is a side elevational view of the reel mechanism after rotating a quarter of a turn in relation to the position shown in FIG. 1.

A safety belt 1 for automobiles is wound up on a reel shaft 2. A wheel 4 provided with sawtooth-like ratchet teeth 3 is rigidly mounted on this shaft 2. A locking pawl 6 radially mounted outside of the ratchet wheel 4 in a housing 5 in such a manner that it can move freely cooperates with the ratchet teeth 3.

A camshaft pulley 7 is arranged close to the ratchet wheel 4, said pulley having the same center of rotation as the wheel 4. The camshaft pulley 7 is round its periphery provided with cams 8, and between said cams there are arc-shaped recesses 9. The cams 8 are equal in number to the teeth 3 of the ratchet wheel 4 and in the normal position of the camshaft pulley 7 each one of said cams 8 is located right in front of a tooth.

The camshaft pulley 7 can be rotated in relation to the ratchet wheel 4 against the bias of a spring means 11 provided in an arc-shaped opening in the form of a slit 10 in the camshaft pulley. This spring means is stretched between one end of the slit opening 10 and a pin 12 rigidly connected with the ratchet wheel 4 and extending in the slit opening.

In a relative rotation movement between the camshaft pulley 7 and the ratchet wheel 4 the ratchet teeth 3 will align with the recesses 9. Because of a second arc-shaped slit opening 13 being provided in the camshaft pulley, in which a stop pin 14 rigidly connected with the ratchet wheel 4 is freely extends, this movement limited to an angle, which corresponds to at the most one half of the distance between two juxtapositioned cams 8 or ratchet teeth 3.

The means further comprises a carrier element 15 composed of a wire spring provided with two legs, one leg of which supports a cross arm 16 (see FIG. 2), which with a certain spring tension abuts against the camshaft pulley 7 and during normal unwinding or winding up of the safety belt 1 slides along the cams 8 and the recesses 9 and by the cams is guided above and past the ratchet teeth 3, while the other leg of the carrier element 15 is attached inside the housing 5. In the event of relative rotation movement between the camshaft pully 7 and the ratchet wheel 4, however, the cross arm 16 will no longer be guided above the ratchet teeth 3 but will be caught by one of the teeth. This causes the point of connection between the two legs (See FIG. 1) to follow the movement of the ratchet wheel 4 against the action of spring means 11 and to push the pawl 6 into engagement with the ratchet wheel.

The means further comprises an activation device, which is intended to bring the reel mechanism to a stop, if the vehicle is subjected to an abnormal change in its movement, or if the vehicle lands up in an abnormal oblique position. This activation device comprises a spherical body of inertia 18 placed in a cup 17, the outside of which has a cylindrical shape, said body of inertia suitably comprising a metal ball. By providing the bottom of the cup 17 with a centrally positioned hole (or a marked recess) the result is that the spherical body 18 in connection with just small insignificant angular changes cannot displace itself out of the neutral position.

An operating member is provided round the upper portion of the spherical body 18, which member in the embodiment illustrated comprises a ring 20, which is provided with a protruding nose 21. The operating member also has a flat portion 22, which in articulated mounting is connected with the lower edge of the cup 17. When the spherical body 18 by occupying an oblique position in a random direction by means of the reel mechanism leaves its neutral position, it urges the operating member 20 to pivot out for a certain distance from the cup 17. An example of such a situation is illustrated in FIG. 4.

A tooth disc 23 is further provided on the outside of the camshaft pulley 7, said disc by frictional contact rotating together with the camshaft pulley in connection with an unwinding or winding up of the safety belt 1. The toothed disc 23 is around its periphery provided with teeth 24, by means of which the nose 21 of the operating member 20 is arranged to cooperate with for the purpose of braking the camshaft pulley 7.

The pendulum arrangement functions in such a manner that when the reel mechanism for instance due to an abrupt change of velocity or the occupation of an oblique position brings the spherical body out of its neutral position, this ball urges the operating member 20 outwardly, so that its nose 21 engages one of the teeth 24 (see FIG. 4). The toothed disc 23, which in this way has been stopped, by its frictional contact with the camshaft pulley 7 brakes this pulley, so that in accordance with what has been described above it is rotated relative to the ratchet wheel 4. A tooth 3 of the ratchet wheel 4 thereby will catch the cross arm 16 of the carrier member 15 and bring about that the carrier element moves the pawl 6 into a locking position in the wheel 4, as described above whereafter the pawl consequently will take up the load and stop the reel mechanism.

According to the invention, the cup 17, the spherical body 18, and the operating member 20 constitute one unit, which can be rotated round the horizontal center axis of the cup 17, and also can be displaced along a circular line having the same center as the reel shaft 2. Said unit is located in a housing 25, and this housing is arranged on a ring shaped plate 26 and can be displaced together with this plate round the toothed disc 23 and axis of the reel by sliding plate 26 on the frame and locking it by means of a locking screw in a desired position. In this manner the reel mechanism for its vertical adjustment can be mounted in other positions than the one shown in FIG. 1, by way of example in the position illustrated in FIG. 8. A measuring scale 27 placed outside of the plate 26 makes it possible to adjust the housing 25 with the activation means in an exactly desired angular position.

In order to make it possible to mount the reel mechanism in different angular positions deviating from a vertical plane, the unit comprising the cup 17, the spherical body of inertia 18, and the operating member 20 is rotatable in the housing 25 round the horizontal center axis of the cup 17 which also coincides with the center axis of the housing 25. In this connection the cup 17 is suitably in its outside end wall 28 provided with one or several recesses or grooves. On the embodiment shown in the drawing this is a groove 29 extending crosswise across the wall. The housing 25 round the cup 17 is moreover provided with tongues 30, which one at a time or, as has been shown, pairwise can be folded inwards into the groove 29 in order to hold the cup in a certain adjusted angular position.

In the FIGS. 6 and 7 it is schematically shown how the reel mechanism has been inclined somewhat in different directions from the vertical position of FIG. 5, whereafter the cup 17 has again been rotated into a neutral position and been fixed in this position by inwards folding of two tongues 30 into the groove 29.

By means of the different adjustment positions of the pendulum means the reel mechanism can easily be adapted to different types of automobiles, and in any particular case it can therefore be mounted in such a position that unwinding and winding up of the safety belt 1 always can take place in the most convenient direction.

The invention is not limited to the embodiment described and illustrated, but can be varied in a number of ways within the scope of the following claims. By way of example the cup 17 for said stepwise adjustment can be provided with longitudinal grooves and the housing 25 with a bar engaging anyone of said grooves or vice versa. In connection with such an embodiment one must consequently extract the cup 17 out of the housing 25, rotate it into a new desired angular position and thereafter again push it into the housing with the bar engaging a new groove.

I claim:

1. Activation means for a safety belt for a vehicle wherein there is provided a reel shaft for winding up said belt, a stop mechanism for the reel shaft having a wheel with ratchet teeth thereon rotatable together with said shaft and a pawl for cooperating with said ratchet teeth, and connecting means operably connecting said activation means with said pawl, said activation means comprising a supporting means, a body of inertia located in said supporting means, and an operating member for cooperation with said body of inertia constituting one unit, said body of inertia having a neutral position in said supporting means and being displaced from said neutral position in response to an abnormal change in movement of the vehicle to move said operating member and through said connecting means to actuate said pawl into engagement with one of said ratchet teeth, said activation means being located in a housing and being rotatable in said housing around a horizontal center axis of the supporting means, and a rotatable ring shaped plate is mounted coaxially with said reel shaft, said housing being supported by said plate for displacement about a circle having the same center as the reel shaft.

2. Activation means according to claim 1, wherein said unit is step-wise rotatable about the horizontal center axis of the supporting means.

3. Activation means according to claim 1, wherein the horizontal center axis of the supporting means is at a different level from the center axis of the reel shaft.

4. Activation means according to claim 1, wherein there is provided a measuring scale to indicate the angular adjusted position of said housing.

5. Activation means according to anyone of claims 2 to 4, wherein there is at least one recess or groove provided in said supporting means, and at least one tongue provided on said housing which can be folded into said recess or groove to hold said supporting means in a given rotated position.

6. Activation means according to anyone of claims 2 to 4, wherein said body of inertia comprises a spherical element movable in a cup-like recess in said supporting means, and said operating member has an arm annularly enclosing the upper portion of said spherical element, said arm being rotatably pivoted in the supporting means and having a chin portion for cooperation with said connecting means.

* * * * *